Figure 1:
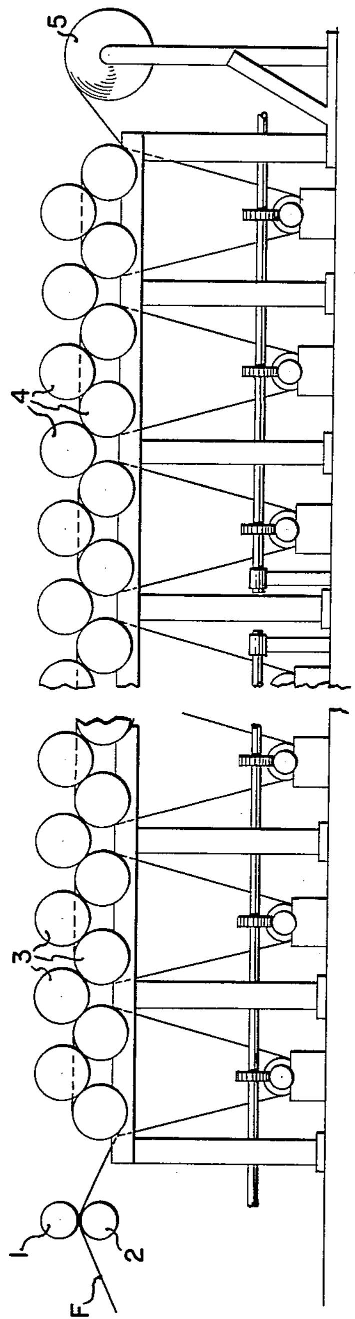

May 22, 1956 W. H. STEVENS 2,746,166

PROCESS OF WEB DRYING

Filed Nov. 30, 1954 2 Sheets-Sheet 1

INVENTOR
WILLIAM HENRY STEVENS

BY A. Ralph Snyder

ATTORNEY

May 22, 1956 W. H. STEVENS 2,746,166

PROCESS OF WEB DRYING

Filed Nov. 30, 1954 2 Sheets-Sheet 2

INVENTOR
WILLIAM HENRY STEVENS

BY A. Ralph Snyder.
ATTORNEY

United States Patent Office 2,746,166

Patented May 22, 1956

2,746,166

PROCESS OF WEB DRYING

William Henry Stevens, Nashville, Tenn., assignor to E. I. du Pont de Nemours and Company, Wilmington, Del., a corporation of Delaware Application November 30, 1954, Serial No. 471,954

4 Claims. (Cl. 34—41)

This invention relates to the manufacture of continuous, non-fibrous, cellulosic sheet material which is subject to shrinkage during drying. More particularly, it relates to the drying of regenerated cellulose film so as to obtain a flat sheet.

In the continuous manufacture of regenerated cellulose film, it is essential that it be dried in such a manner as to give a dry film which is substantially flat. The problem of obtaining a flat sheet is a very difficult one since regenerated cellulose film shrinks in all three dimensions when it is being dried, thus setting up non-uniform tension conditions within the film.

Flatness of a film is a characteristic of continuous films which is an important determining factor in their running qualities on converter and processing equipment. An absolutely flat sheet, having no droop, is the goal of all continuous film manufacturers.

Flatness is determined by stretching a film longitudinally across two carefully aligned, horizontal, parallel supporting rolls or bars 15 feet apart. The film ends are rigidly held and tension is applied longitudinally to the film over the unsupported span of 15 feet. The contour of a transverse section of the film at approximately the center of the unsupported span is observed and major departures from a straight, horizontal line are measured in inches. Experience has shown that a lack of flatness and, particularly, the presence of slack longitudinal lane between two supporting lanes, called center droop, is extremely detrimental to satisfactory operation in bag-making machines, wrapping machinery, printing presses, etc. Drooping of the film edges, depending upon severity, is also undesirable.

Much prior work has been done with the objective of producing an essentially flat film web, no lanes of which differ in length by an amount which will cause droop. However, none of the processes heretofore developed have given satisfactory web flatness characteristics and have thus never been adopted in commercial operation.

The principal objective of the present invention, therefore, is to provide a process for the production of substantially flat, continuous, non-fibrous cellulosic sheet material. A further object is to provide an improved process for drying continuous gel regenerated cellulose film to produce a substantially flat film. The above and other objects will more clearly appear hereinafter.

These objects are realized by the present invention which, briefly stated, comprises passing a continuous web of gel (water-saturated) cellulosic film, e. g., gel regenerated cellulose, through a drying zone wherein the web is subjected to drying conditions maintained substantially uniform across the width of the web whereby the web transverse moisture distributing profile throughout the drying process is substantially symmetrical, maintaining the web under a machine direction (longitudinal) tension just sufficient to prevent wrinkling or distortion of the web until the moisture content of the edge lanes has been reduced to approximately 0.1 to 0.5 times the weight of the dry cellulose and the moisture content of the center section of the web has been simultaneously reduced to approximately 0.3 to 1.5 times the weight of the dry cellulose, the center section being more moist than the edge lanes, and thereafter increasing the machine direction tension in the web to an amount sufficient to elongate the more moist and still plastic shorter center section of the webb of film to approximately the same length, as the drier edge lanes of the web, and completing drying thereof.

By the expression "tension just sufficient to prevent wrinkling or distortion of the web," used herein, is meant a tension on the web, in the machine or longitudinal direction of the web, which is effective to prevent wrinkling or distortion of the web, but which is not sufficient to prevent substantial shrinkage of the web as it dries.

The present invention is predicated upon the unexpected discovery that sheet flatness or, conversely, droop, is a function of applied web tension at a critical stage in the drying process, provided that the web transverse moisture distribution profile throughout the drying process is substantially symmetrical and at this critical stage is substantially symmetrical and convex, i. e., at equidistant points from both edges, the moisture contents of the film are approximately equal, and the edges are drier than the center.

By the expression "web transverse moisture distribution profile," used herein, is meant a plot of the moisture content across the width of the web (transverse axis of the web) measured by analyzing the moisture content of successive bands or lanes across the web, each band being three inches wide.

By "edge lanes" is meant the areas at each edge of the web extending lengthwise of the web and each bounded on one side by the edge of the web and on the other side by a line from 3 to 6 inches in from the edge of the web and parallel thereto. The "center section" constitutes the remaining area of the web between the edge lanes.

The process of the present invention is generally applicable to the drying of continuous webs of any wet-cast cellulosic film. However, because of the commercial importance of regenerated cellulose film derived from viscose, such film constitutes the preferred material for treatment in accordance with the principles of the present invention, and the invention will be described hereinafter with specific reference to the drying of gel regenerated cellulose film.

Figure 2:
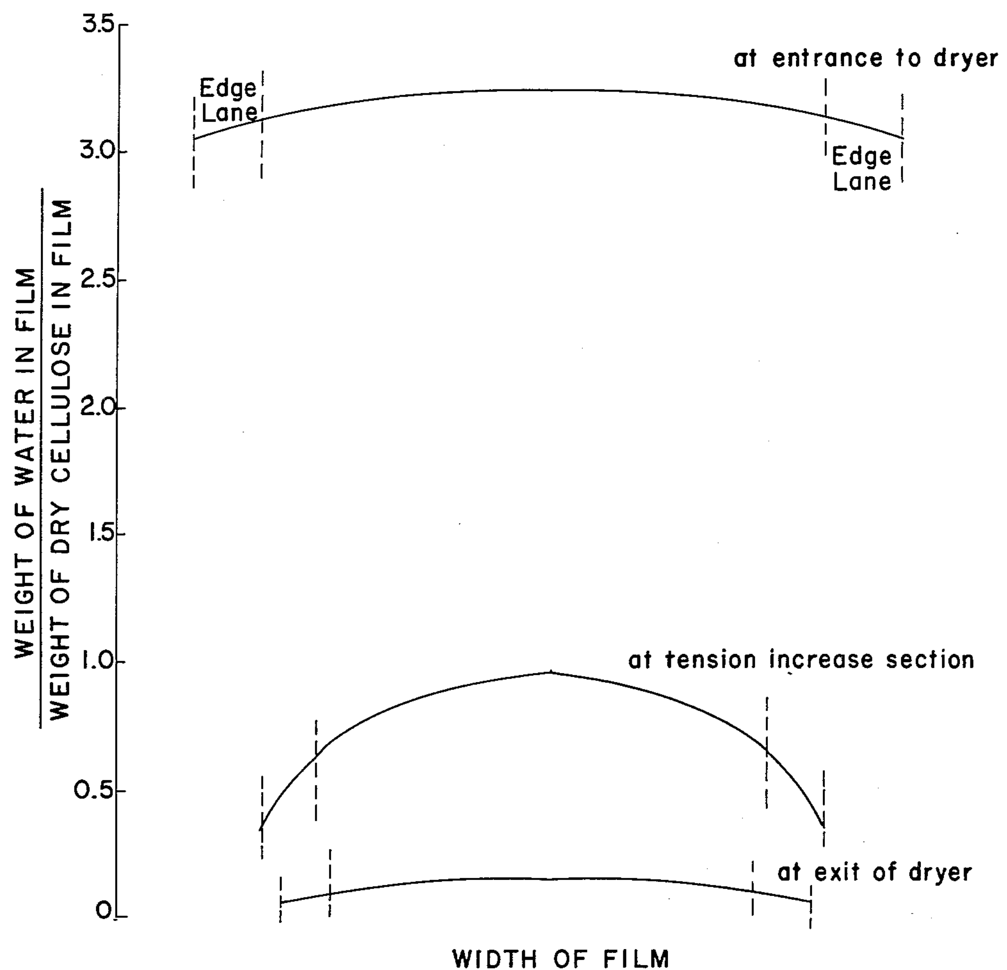

The commercial scale method of continuously manufacturing regenerated cellulose film from an aqueous solution of sodium cellulose xanthate (viscose) is disclosed in United States Patents Numbers 1,548,864 and 1,601,289 to Brandenberger. In this process, viscose is forced through an elongated orifice in the form of a sheet into a coagulating bath to form a coherent web, which freshly coagulated film is then promptly regenerated, washed, desulfured, bleached, softened and dried. The dried film is wound into rolls (sometimes called "mill rolls") for convenience in handling, storing, and processing. Up through the softening stage, the web of regenerated cellulose remains in a gel (completely saturated with aqueous solution) condition. Since gel regenerated cellulose film contains about 3.0 to 3.5 times the weight of the dry cellulose as water, a substantial amount of moisture must be removed in the drying operation. In losing this moisture, the film shrinks in length, width and thickness (thus diminishing the area of the film obtained) and becomes puckered and wrinkled. To prevent excessive loss of area, the formation of surface irregularities (puckers, wrinkles and the like), and impairment of transparency, it is customary to dry the web by passing it about a series of heated rolls, such as are described in United States Patents Numbers 2,000,179 (Herndon), 2,141,277 (Chylinski), etc., which are operated at speeds which maintain in the film both longitudinal and transverse tensions sufficient to lessen or prevent the aforementioned decrease in area and surface deformation. The present invention is concerned with the drying stage of the above described process of manufacture and will now be specifically disclosed with reference to the accompanying drawings wherein:

Figure 1 is a fragmentary diagrammatic elevational view of drying apparatus; and Figure 2 is a graph showing the web transverse moisture distribution profile at indicated points in the drying apparatus.

Referring to Figure 1, wet gel regenerated cellulose film web F, after leaving the softener tank, passes between squeeze rolls or scraping devices 1 and 2 which remove excess softener bath, and enters the dryer at approximately the same linear speed as in the softener tank and contains approximately 3.0–3.5 times the weight of the dry cellulose as water. In the first section of the dryer, the film web passes over a series of conventional dryer rolls 3 operated at a speed which will maintain the web under just enough longitudinal or machine direction tension to prevent wrinkling or distortion of the web. The dryer rolls are uniformly heated and heated air is circulated across the web so as to maintain the web at substantially uniform drying temperature whereby to insure a symmetrical transverse moisture distribution profile (see Figure 2). When the moisture content within the edge lanes of the web has been reduced to approximately 0.1–0.5 times the weight of the dry cellulose and the moisture content of the center section has been simultaneously reduced to approximately 0.3–1.5 times the weight of the dry cellulose, the web tension has increased as a result of shrinkage forces generated by the drying film which is still traveling at the same linear speed. If the web were allowed to continue drying on rolls driven at the same peripheral speed as the rolls in the preceding portion of the dryer, film tension would continue to increase, but the edge lanes would be longer than the center lanes and would exhibit droop.

By the process of this invention, when the moisture content of the film web has been reduced to values specified above, the web is passed over a second section of dryer rolls 4, the peripheral speed of which is increased by from between about 0.4% to about 3.0% above that of the immediately preceding driven rolls 3. This increase in peripheral speed increases web tension and causes the more moist and still plastic shorter lanes to elongate to approximately the same length as the already-dried edge (or other longer) lanes. The drying is then completed with all film lanes at approximately the same length, and the film leaves the dryer and is collected as a mill roll 5 with a moisture content of approximately 0.06 times the weight of the dry cellulose. As stated hereinabove, at the critical stage where the peripheral speed is increased, the web transverse moisture distribution profile must be approximately symmetrical and the edge lanes must always be drier than the center. This is achieved by maintaining the drying temperatures substantially uniform across the surfaces of the web.

The optimum increase in peripheral speed differs somewhat for different thicknesses of film and for films with different degrees of plasticization. For this reason it is desirable, but not essential, to be able to vary the difference between peripheral speeds before and after the point of critical web moisture content. Excellent sheet flatness has been obtained with variable and with fixed speed differences, and with the following methods of applying the difference:

1. At one point between two successive dryer rolls.

2. Incrementally, with the speed differential distributed over from two or more lower dryer rolls.

3. Between the entrance and exit of a section of freely rotating rolls, driven by the web, the film moisture contents at entrance to this section being in the specified ranges.

Mill rolls of regenerated cellulose film dried under the conditions of this invention may be slit directly into rolls of narrower width as specified by the purchasers of the film, or the rolls may be coated with various compositions before being slit. As shown in the following table, the slit rolls have excellent flatness properties.

Sheet flatness data of slit rolls from mill rolls made according to the prior method of drying wherein all dryer rolls operate at approximately the same peripheral speed (identified in the table as the "Old" method) and from mill rolls made according to the tension increase method of this invention (identified in the table as the "New" method) are presented in the following table.

TABLE I

*Comparative slit roll sheet flatness data*

| Drying Method | Approximate Film Thickness, inches | Number of Rolls Tested | Percent Having Edge Droop of ¼″ or Less | |
|---|---|---|---|---|
| | | | At 1.0 lb./in. Tension | At 1.4 lb./in. Tension |
| Old | 0.0010 | 2,503 | 71.7 | 91.5 |
| New | 0.0010 | 800 | 84.5 | 99.4 |
| | | | Edge Droop at 1.4 lb./in. Tension—Average Droop, inches | |
| Old | 0.0017 | 1,236 | 2.13 | |
| Old | 0.0017 | 1,294 | 2.23 | |
| New | 0.0017 | 225 | 0.85 | |
| New | 0.0017 | 72 | 0.96 | |

It is readily seen that this invention gives slit rolls with a much higher percentage of acceptance than the old method, especially with film 0.0017″ thick. Slit rolls having edge droop of more than ¼″ (1¼″ on 0.0017″ thick films) at 1.4 lb. of tension per inch of film width are considered unsatisfactory for use on such automatic machinery as printing presses, bag-making equipment, etc.

I claim:

1. The process which comprises passing a continuous web of non-fibrous gel cellulosic sheet material, comprising edge lanes and a center section, through a drying zone, subjecting the web in said zone to drying temperatures maintained substantially uniform across the width of the web whereby the web transverse moisture distribution profile is maintained substantially symmetrical, maintaining the web under longitudinal tension just sufficient to prevent wrinkling or distortion of the web until the moisture content of the edge lanes of the web has been reduced to approximately 0.1 to 0.5 times the weight of the dry cellulosic material and the moisture content of the center section of the web has been simultaneously reduced to approximately 0.3 to 1.5 times the the weight of the dry cellulosic material, said center section being more moist than said edge lanes, and thereafter increasing the longitudinal tension on the web to an amount sufficient to elongate the center section to approximately the same length as the edge lanes, and completing drying of the web.

2. The process of claim 1 wherein the cellulosic sheet material is regenerated cellulose film.

3. The process which comprises passing a continuous web of gel regenerated cellulose film, comprising edge lanes and a center section, over a first series of dryer rolls driven at a speed effective to maintain the web under a longitudinal tension just sufficient to prevent wrinkling or distortion of the web, said web being subjected to drying temperature maintained substantially uniform across the width of the web, drying said film on said first series of rolls until the moisture content of the edge lanes of said web has been reduced to approximately 0.1 to 0.5 times the weight of the dry cellulose and the moisture content of the center section of said web has been simultaneously reduced to approximately 0.3 to 1.5 times the weight of the dry cellulose, the center section being more moist than the edge lanes, and thereafter passing said web over a second series of dryer rolls driven at a speed effective to increase the longitudinal tension on the web to an amount sufficient to elongate the center section of said web to substantially the same length as the edge lanes, and completing drying of said webs on said second series of dryer rolls.

4. The process of claim 3 wherein said second series of rolls is driven at a peripheral speed between about 0.4% to about 3.0% above the peripheral speed of said first series of rolls.

References Cited in the file of this patent

UNITED STATES PATENTS

| | | |
|---|---|---|
| 1,975,708 | Bleibler | Oct. 2, 1934 |
| 2,115,132 | Alles et al. | Apr. 26, 1938 |
| 2,308,161 | Eckstein et al. | Jan. 12, 1943 |